US012649251B2

(12) United States Patent
Liang

(10) Patent No.: US 12,649,251 B2
(45) Date of Patent: Jun. 9, 2026

(54) ELASTIC SWITCHABLE SCISSORS FOR UNPACKING

(71) Applicant: Yangjiang Jiangcheng Gangfeng Hardware & Plastic Products Co., Ltd., Yangjiang City (CN)

(72) Inventor: Jinming Liang, Yangjiang City (CN)

(73) Assignee: YANGJIANG JIANGCHENG GANGFENG HARDWARE & PLASTIC PRODUCTS CO., LTD., Yangjiang City (CN)

( * ) Notice: Subject to any disclaimer, the term of this patent is extended or adjusted under 35 U.S.C. 154(b) by 76 days.

(21) Appl. No.: 18/812,288

(22) Filed: Aug. 22, 2024

(65) Prior Publication Data

US 2024/0408778 A1 Dec. 12, 2024

(51) Int. Cl.
*B26B 13/28* (2006.01)

(52) U.S. Cl.
CPC .................................. *B26B 13/285* (2013.01)

(58) Field of Classification Search
None
See application file for complete search history.

(56) References Cited

U.S. PATENT DOCUMENTS 5,819,416 A * 10/1998 Robinson ................ B26B 13/20 30/271
11,485,033 B1 * 11/2022 Peng ....................... B26B 13/28
2008/0178472 A1 * 7/2008 Abele ...................... B26B 13/16 30/271
2024/0408778 A1 * 12/2024 Liang .................... B26B 13/285

FOREIGN PATENT DOCUMENTS

| | | | |
|---|---|---|---|
| CN | 217915426 | U | 11/2022 |
| JP | 2012187355 | A | 10/2012 |
| JP | 3234211 | U | 9/2021 |
| KR | 20180091386 | A | 8/2018 |

OTHER PUBLICATIONS

English translation of CN-217915426-U, dated Nov. 29, 2022.*

* cited by examiner

*Primary Examiner* — Hwei-Siu C Payer
(74) *Attorney, Agent, or Firm* — SHIMOKAJI IP

(57) ABSTRACT

Elastic switchable scissors for unpacking includes a connecting pin, and a first scissor blade and a second scissor blade. The first scissor blade is provided with a moving hole, and the connecting pin passes through the moving hole and is fixedly connected to the second scissor blade, thereby allowing the first scissor blade to pivot around the connecting pin. An elastic switchable member is positioned in the receiving groove of the first scissor blade, and clamped between the first and second scissor blades, and the elastic part of the elastic switchable member is extended into a projection area of the moving hole and is retractable to block or release the movement of the connecting pin within the moving hole. The scissors have simple structure, easy assembly, and low production cost.

14 Claims, 7 Drawing Sheets

ELASTIC SWITCHABLE SCISSORS FOR UNPACKING

FIELD OF THE INVENTION

The present invention relates to the field of scissors, and particularly to elastic switchable scissors for unpacking.

BACKGROUND OF THE INVENTION

Scissors are a common tool in daily life, mainly used for cutting fabrics, paper, steel plates, ropes, steel bars, and other sheet-like or linear objects. They are a dual-edge tool, with two blades that intersect and can be opened and closed.

When packaging objects in a box, transparent tapes or packing straps are usually used to seal the box. To unpack the box, a knife or scissors is often used to cut through the tapes or straps, allowing the box to be unpacked. Although current scissors can be used to cut the tapes or straps sealing the box, they require the two scissor blades to be opened relative to each other, so as to cut with one of the cutting edges. However, this is less convenient compared to using a knife. Furthermore, only one scissor blade is used for cutting, the other scissor blade is exposed, which brings a safety hazard during operation to easily cause hand injuries in an improper use.

There are also specialized scissors for unpacking boxes, as seen in Chinese Patent No. CN215589229U, which discloses scissors for unpacking. The scissors include a first scissor blade, a second scissor blade, a connecting pin, and a moving hole. A rubber component with a sliding channel and a pivot hole is formed in the moving hole through injection molding. The integrated structure formed by injection molding complicates the assembly of the scissors, which significantly increases production costs. Moreover, when the first scissor blade and the rubber component are integrated, simultaneous replacements of the first scissor blade and the connecting pin are required due to the wear caused by the connecting pin moving within the sliding channel and the pivot hole, which reduces the product's competitiveness and does not meet market demand.

To address these issues, there is a need to provide scissors for unpacking that can be elastically switched.

SUMMARY OF THE INVENTION

One objective of the present invention is to provide elastic switchable scissors for unpacking with a simple structure, easy assembly, and low production cost.

To achieve the above-mentioned objective, the present invention provides elastic switchable scissors for unpacking including a connecting pin, and a first scissor blade and a second scissor blade capable of cutting each other. A tail end of the first scissor blade is connected with a first scissor handle, and a tail end of the second scissor blade is connected with a second scissor handle. The first scissor blade is provided with a moving hole for allowing the connecting pin to move, the connecting pin passes through the moving hole and is fixedly connected to the second scissor blade, thereby allowing the first scissor blade to pivot around the connecting pin relative to the second scissor blade. The first scissor blade is movable back and forth relative to the second scissor blade by virtue of a movement of the connecting pin within the moving hole, with an extended position and a retracted position. The elastic switchable scissors further includes an elastic switchable member which has an elastic part, the first scissor blade is provided with a receiving groove on a surface facing the second scissor blade, which is connected with the moving hole, the elastic switchable member is positioned in the receiving groove and clamped between the first and second scissor blades, and the elastic part of the elastic switchable member is extended into a projection area of the moving hole and is retractable to block or release the movement of the connecting pin within the moving hole, thereby allowing the first scissor blade to be operatively switched between the extended position and the retracted position relative to the second scissor blade.

Preferably, two elastic parts are provided and symmetrically arranged along a moving direction of the first scissor blade, with a distance between the two elastic parts being less than a diameter of the connecting pin.

Preferably, the elastic switchable member includes a switching body, with a through hole provided on the switching body, the connecting pin also passes through the through hole, and the switching body is extended to the through hole to form the elastic part.

Preferably, the through hole includes a first arc, a first long side, a second arc, and a second long side which are sequentially arranged to define the through hole, and the elastic part is provided between the first arc and the first long side and/or between the second arc and the second long side.

Preferably, the first arc, the elastic part, and the second arc together define a switching channel for the connecting pin, when the connecting pin moves to the first arc, the first scissor blade is in the retracted position; when the connecting pin moves to the second arc, the first scissor blade is in the extended position.

Preferably, an elastic gap is formed between the through hole and one side of the elastic part away from the switching channel, thereby allowing for elastic deformation of the elastic part.

Preferably, the connecting pin includes a cap and a connecting post that are connected to each other, where the connecting post is movable within the moving hole, the connecting post is cylindrical, and diameters of the first and second arcs are equal to a diameter of the connecting post.

Preferably, the first arc and the second arc are symmetrically arranged, the first long side and the second long side are symmetrically arranged and parallel to each other, and centers of the first and second arcs are located on a symmetry axis of the first and second long sides.

Preferably, the elastic switchable member has a sheet-like structure.

Preferably, an outer contour of the receiving groove is matched with that of the elastic switchable member, and the elastic switchable member is flush with a surface of the first scissor blade.

Preferably, the moving hole includes a third arc, a third long side, a fourth arc, and a fourth long side which are sequentially arranged to define the moving hole.

Preferably, the connecting pin includes a cap and a connecting post that are connected to each other, where the connecting post is movable within the moving hole, the connecting post is cylindrical, and diameters of the third and fourth arcs are equal to a diameter of the connecting post.

Preferably, the third arc and the fourth arc are symmetrically arranged, the third long side and the fourth long side are symmetrically arranged and parallel to each other, and centers of the third and fourth arcs are located on a symmetry axis of the third and fourth long sides.

Preferably, the connecting pin includes a cap and a connecting post that are connected to each other, where the connecting post is movable within the moving hole, the cap is arranged outside the first scissor blade, and a protective ring is sleeved on the cap.

Preferably, an inner side of the first handle is provided with a first buffer protrusion, and an inner side of the second scissor handle is provided with a second buffer protrusion, with the first and second buffer protrusions corresponding to each other.

In comparison with the prior art, the elastic switchable member of the elastic switchable scissors for unpacking in the present invention is configured between the first scissor blade and the second scissor blade, the movement of the connecting pin within the moving hole allows the first scissor blade to move back and forth relative to the second scissor blade, and the first scissor blade has an extended position and a retracted position relative to the second scissor blade. When the first scissor blade is in the retracted position, the blade tip of the second scissor blade is protruded beyond the blade tip of the first scissor blade, so that the first scissor blade is not aligned with and the second scissor blade and can move relative to the second scissor blade in a staggered manner. When the first scissor blade and the second scissor blade are fully closed, the blade tip of the second scissor blade is exposed, by which the transparent tapes or the packaging straps can be cut so as to unpack the box. When the first scissor blade is in the extended position, the blade tip of the second scissor blade is aligned with the blade tip of the first scissor blade, and the first scissor blade can reset to the extended position relative to the second scissor blade. The first scissor blade has a receiving groove on the surface facing the second scissor blade, which is connected with the moving hole. The elastic switchable member is positioned within the receiving groove and is clamped between the first scissor blade and the second scissor blade. The receiving groove provides an assembly space for the elastic switchable member, ensuring that the elastic switchable member is stably clamped between the first scissor blade and the second scissor blade. The elastic switchable member is positioned within the receiving groove and is clamped between the first scissor blade and the second scissor blade, and the elastic part of the elastic switchable member is extended into the projection area of the moving hole and can be operatively retracted to block or release the movement of the connecting pin within the moving hole, allowing the first scissor blade to be operatively switched between the extended position and the retracted position relative to the second scissor blade. It is understood that, with the action of the moving hole, the first scissor blade can freely move back and forth relative to the second scissor blade, without locked in the extended or retracted position. The elastic action part of the elastic part, which extends into the projection area of the moving hole, cooperates with the moving hole to provide a resisting force when the first scissor blade switches between the extended position and the retracted position relative to the second scissor blade. Manual pushing force is required to overcome the resistance of the elastic part so that the elastic part of the elastic switchable member can be operatively retracted to block or release the movement of the connecting pin within the moving hole, thereby allowing the first scissor blade to be operatively switched between the extended position and the retracted position relative to the second scissor blade. When the manual pushing force is withdrawn, the first scissor blade is self-locked in either the extended or retracted position relative to the second scissor blade. The structure is simple, and the switching is flexible, without the need for an additional locking structure. The elastic switchable member, the first scissor blade, and the second scissor blade are provided separately, not only facilitating assembly but also allowing the elastic switchable member to be replaced without the need to replace the first scissor blade, thereby meeting production requirements.

DETAILED DESCRIPTION OF ILLUSTRATED EMBODIMENTS

Figure 1:
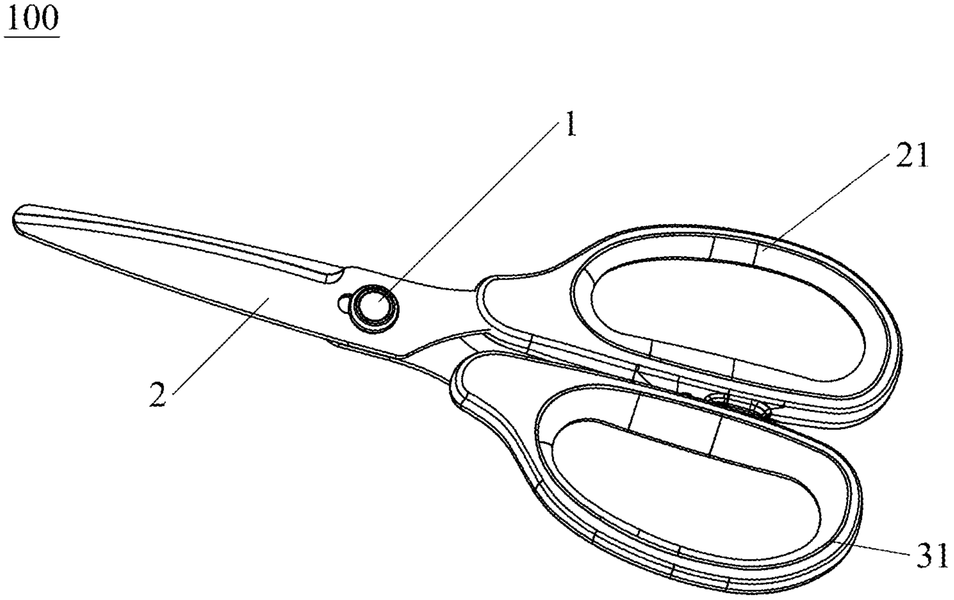
FIG. 1 is a perspective structural diagram of the elastic switchable scissors for unpacking of the present invention, with the first scissor blade in the extended position.

To explain the technical content, structural features and effects of the present invention in detail, the following description is made in conjunction with the embodiments and accompanying drawings.

Referring to FIGS. 1 to 13, elastic switchable scissors 100 of the present invention includes an elastic switchable member 4, a connecting pin 1, a first scissor blade 2, and a second scissor blade 3. The first scissor blade 2 and the second scissor blade 3 can shear against each other. A tail end of the first scissor blade 2 is connected to a first handle 21, and a tail end of the second scissor blade 3 is connected to a second handle 31. The first scissor blade 2 has a moving hole 22 for allowing the connecting pin 1 to move within, where the moving hole 22 is an elongated slot. The connecting pin 1 passes through the moving hole 22 and is fixedly connected to the second scissor blade 3, thereby allowing the first scissor blade 2 to pivot around the connecting pin 1 relative to the second scissor blade 3, by means of this pivoting motion, the cutting action between the first scissor blade 2 and the second scissor blade 3 is achieved.

Figure 2:
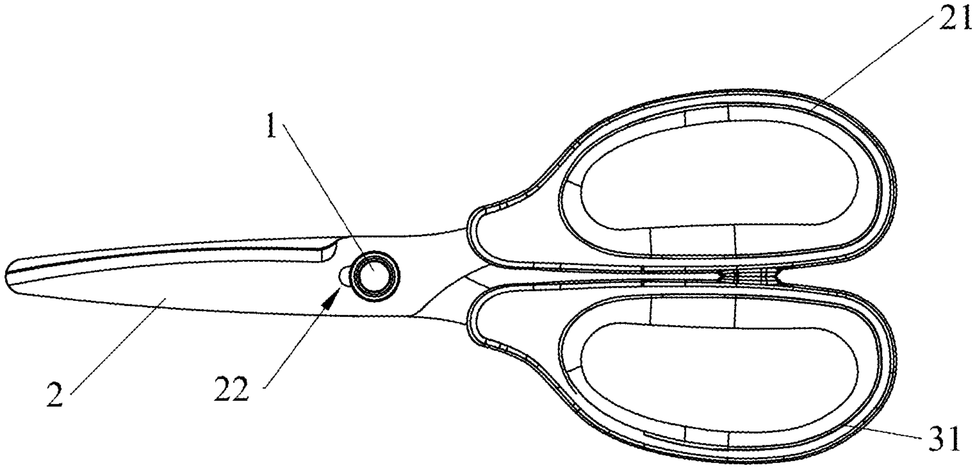
FIG. 2 is a front view of the elastic switchable scissors for unpacking of FIG. 1.
Figure 3:
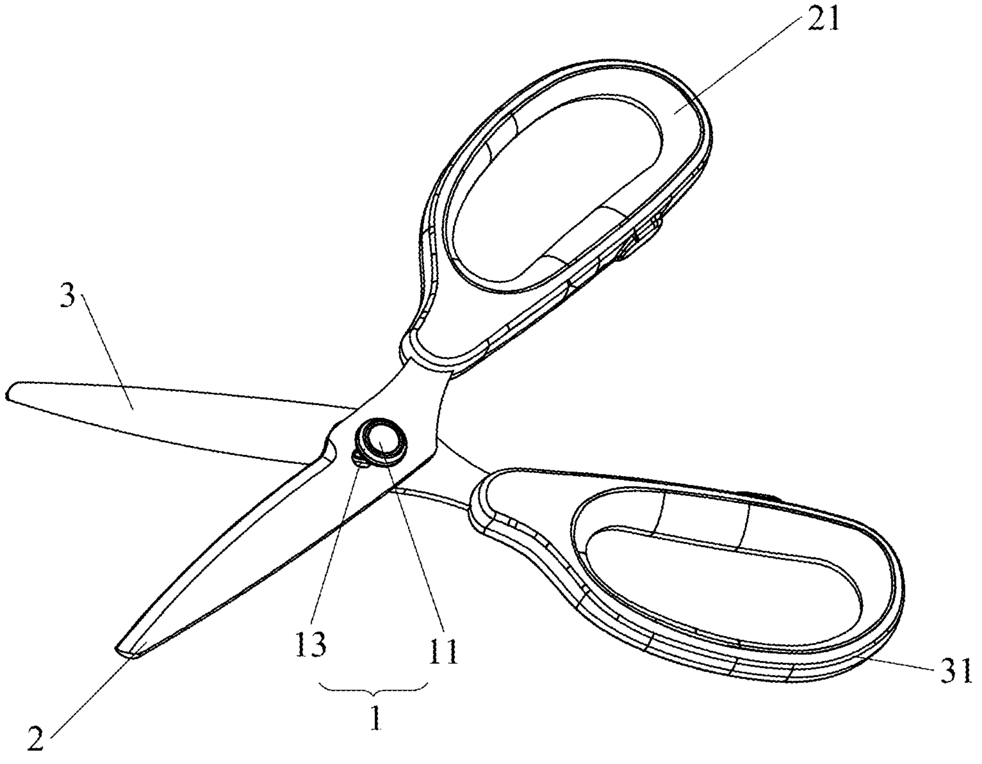
FIG. 3 is a perspective structural diagram of the elastic switchable scissors for unpacking of the present invention in the open state.
Figure 5:
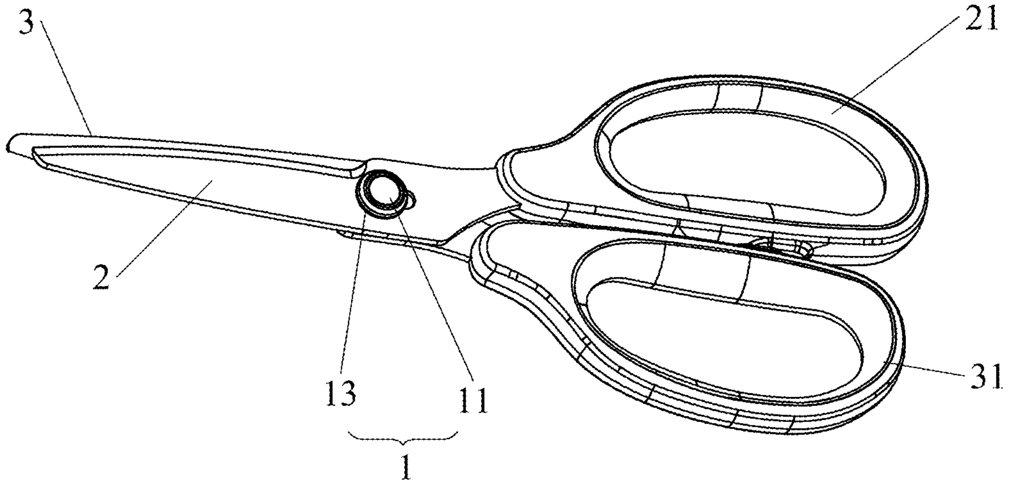
FIG. 5 is a perspective structural diagram of the elastic switchable scissors for unpacking of the present invention, with the first scissor blade in the retracted position.
Figure 6:
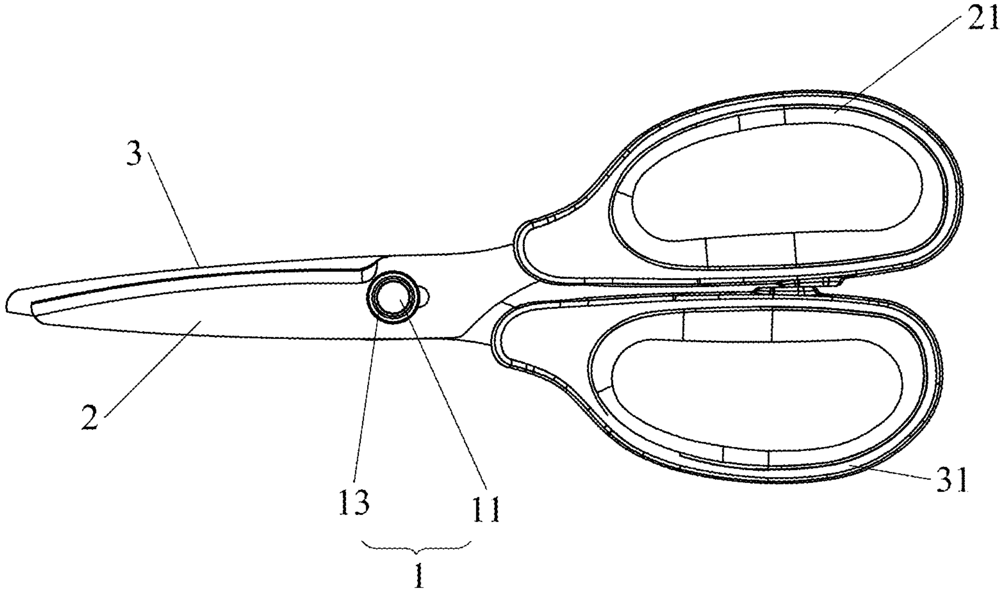
FIG. 6 is a front view of the elastic switchable scissors for unpacking of FIG. 5.

The first scissor blade 2 is movable back and forth relative to the second scissor blade 3 by virtue of the movement of the connecting pin 1 within the moving hole 22, and the first scissor blade 2 has an extended position as shown in FIGS. 1-2) and a retracted position (as shown in FIGS. 5-6). When the first scissor blade 2 is in the retracted position, the blade tip of the second scissor blade 3 is protruded beyond the blade tip of the first scissor blade 2, that is to say, the blade tips of the first and second scissor blades 2 and 3 are staggered and not aligned (referring to FIG. 13). Under the retracted position, when the first scissor blade 2 and the second scissor blade 3 are in a fully closed state, the blade tip of the second scissor blade 3 is exposed, by which the transparent tapes or packaging straps can be cut so as to unpack the box or case. When the first scissor blade 2 is in the extended position, the blade tip of the second scissor blade 3 is aligned with the blade tip of the first scissor blade 2 (referring to FIG. 11).

The elastic switchable member 4 has an elastic part 42, and the first scissor blade 2 is provided with a receiving groove 23 communicating with the moving hole 22 on the surface facing the second scissor blade 3. The elastic switchable member 4 is positioned within the receiving groove 23 and is clamped between the first scissor blade 2 and the second scissor blade 3. The receiving groove 23 provides an assembly space for the elastic switchable member 4, allowing it to be stably clamped between the first scissor blade 2 and the second scissor blade 3. The elastic switchable member 4 is positioned within the receiving groove 23 and is clamped between the first scissor blade 2 and the second scissor blade 3, with the elastic part 42 extending into the projection area of the moving hole 22. The elastic part 42 can be operatively retracted to block or release the movement of the connecting pin 1 within the moving hole 22, thereby allowing the first scissor blade 2 to be operatively switched between the extended position and the retracted position relative to the second scissor blade 3 (referring to FIGS. 11 to 13).

Figure 12:
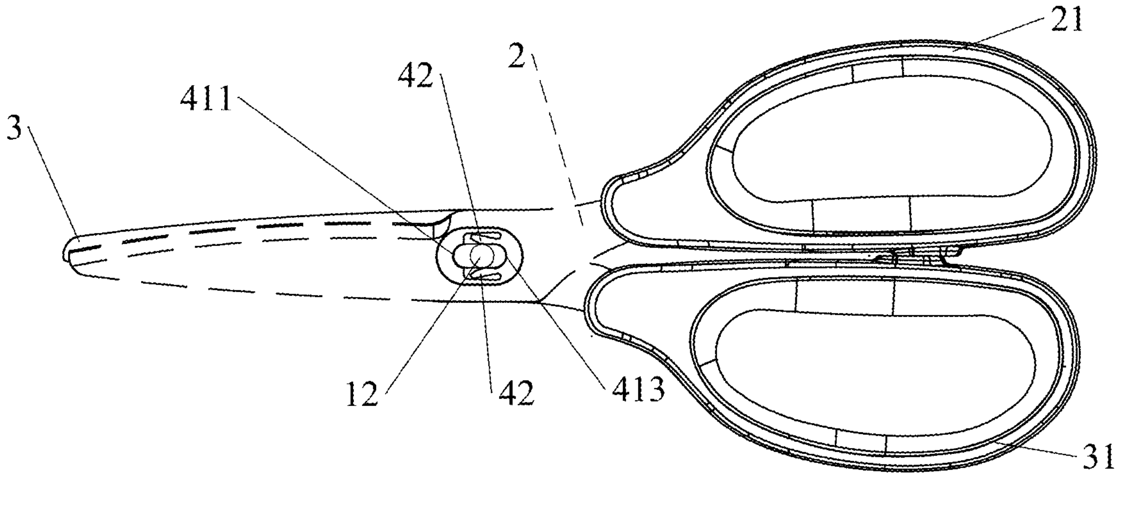
FIG. 12 is an intermediate transition state diagram showing the first scissor blade moving from the extended position to the retracted position relative to the second scissor blade in the elastic switchable scissors for unpacking of the present invention.
Figure 13:
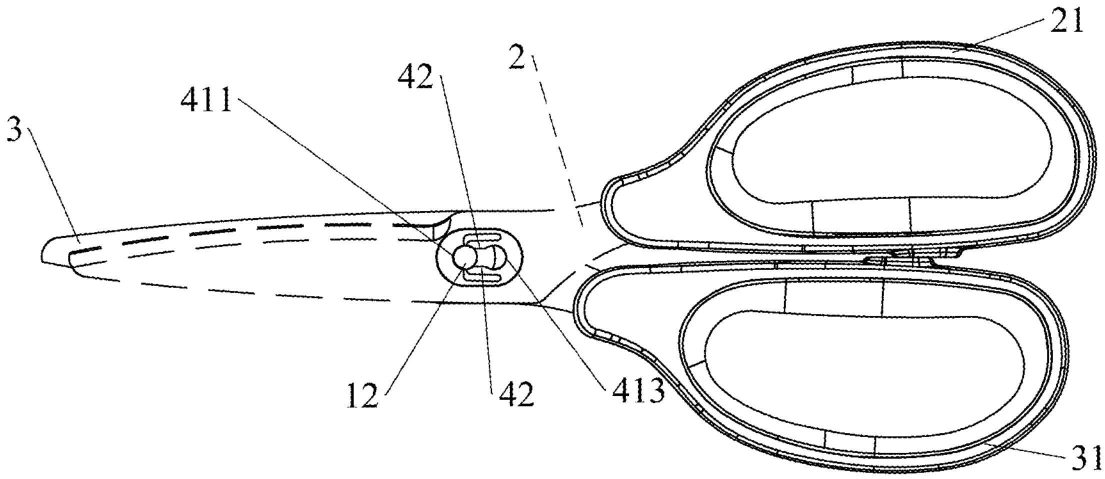
FIG. 13 is an internal structural diagram of the elastic switchable scissors for unpacking of FIG. 6.

Under only the action of the moving hole 22, the first scissor blade 2 can move freely back and forth relative to the second scissor blade 3, without being locked in either the extended or retracted position. The elastic action part 42*a* of the elastic part 42, which extends into the projection area of the moving hole 22, cooperates with the moving hole 22 to provides a resisting force when the first scissor blade 2 switches between the extended position and the retracted position relative to the second scissor blade 3 (switching state is shown in FIG. 12). Manual pushing force is required to overcome the resistance of the elastic part 42, so that the elastic part 42 of the elastic switchable member 4 is retracted to block or release the movement of the connecting pin 1 within the moving hole 22, thereby allowing the first scissor blade 2 to be operatively switched between the extended position and the retracted position relative to the second scissor blade 3. When the manual pushing force is withdrawn, the first scissor blade 2 is self-locked in either the extended or retracted position relative to the second scissor blade 3. The structure is simple and the switching is flexible, without the need for an additional locking structure. It is understood that when the first scissor blade 2 is in either the extended or retracted position, it can pivot relative to the second scissor blade 3 to achieve cutting. The elastic switchable member 4, the first scissor blade 2, and the second scissor blade 3 are provided separately, not only facilitating assembly but also allowing the elastic switchable member 4 to be replaced without the need to replace the first scissor blade 2 simultaneously, thus meeting production requirements.

Figure 8:
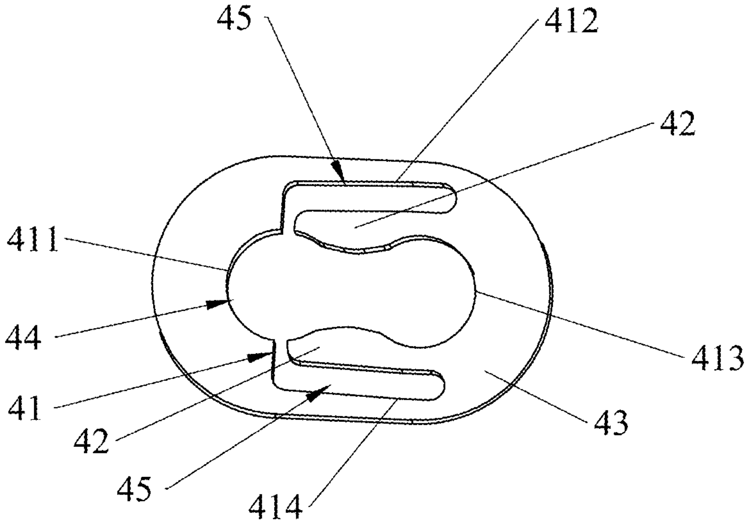
FIG. 8 is a perspective structural diagram of the elastic switchable member of the elastic switchable scissors for unpacking of the present invention.
Figure 9:
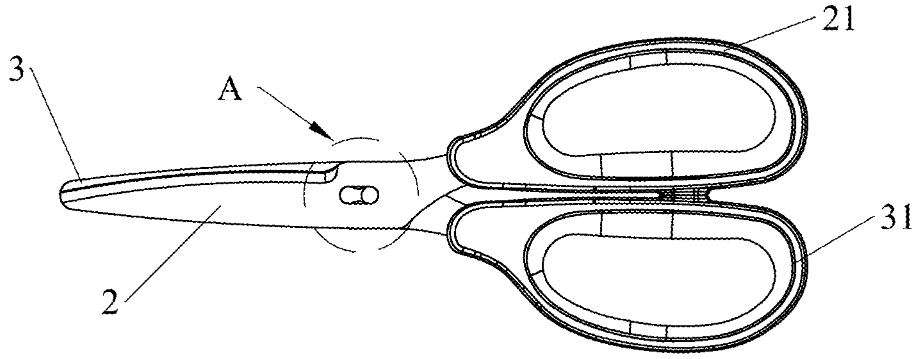
FIG. 9 is a structural diagram of the elastic switchable scissors for unpacking of FIG. 2 with the cap being hidden.

More specifically, referring to FIG. 8, the elastic switchable member 4 includes a switching body 43 with a through hole 41 formed thereon. The connecting pin 1 also passes through the through hole 41, through the first scissor blade 2, the elastic switchable member 4, and the second scissor blade 3, and is finally riveted to the second scissor blade 3. The connecting pin 1 is fixed to the second scissor blade 3, the switching body 43 is extended to the through hole 41 to form the elastic part 42. Specifically, the through hole 41 includes a first arc 411, a first long side 412, a second arc 413, and a second long side 414. The first arc 411, the first long side 412, the second arc 413, and the second long side 414 are sequentially arranged to define the through hole 41.

Figure 7:
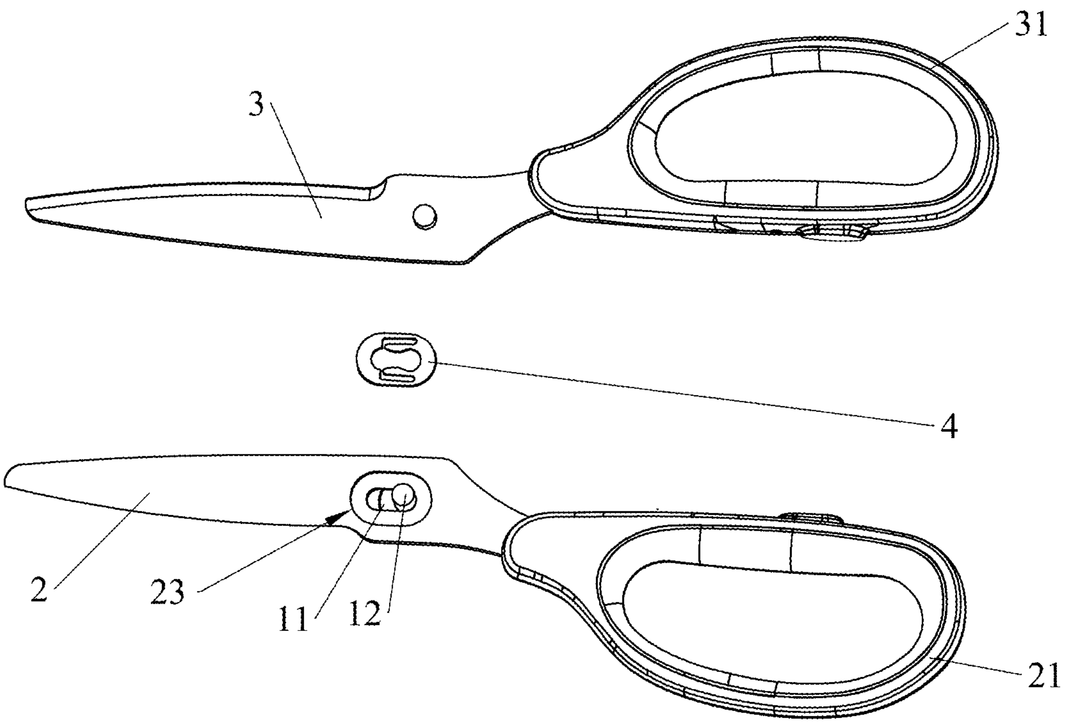
FIG. 7 is an exploded view of the elastic switchable scissors for unpacking of the present invention.

Referring to FIGS. 6-8, two elastic parts 42 are provided and symmetrically arranged along the moving direction of the first scissor blade 2. The distance between the two elastic parts 42 is smaller than the diameter of the connecting pin 1. The connecting pin 1 includes a cap 11 and a connecting post 12, which are connected to each other, and the elastic parts 42 block the connecting post 12 of the connecting pin 1. The elastic parts 42 are positioned between the first long side 412 and the second arc 413 and between the second arc 413 and the second long side 414. In other embodiments, when only one elastic part 42 is provided and positioned between the first long side 412 and the second arc 413, or between the second arc 413 and the second long side 414. That is, the elastic part 42 is only arranged at one side and still can provide a blocking function, which may be adaptively adjusted as needed.

Referring to FIGS. 8 to 13, the first arc 411, the elastic part 42, and the second arc 413 together define a switching channel 44 through which the connecting pin 1 can switch. When the connecting pin 1 moves to the first arc 411, the first scissor blade 2 is in the retracted position (see FIG. 2). When the connecting pin 1 moves to the second arc 413, the first scissor blade 2 is in the extended position (see FIG. 11). Specifically, an elastic gap 45 is formed between the through-hole 41 and the side of the elastic part 42 that faces away from the switching channel 44, thereby allowing for the elastic deformation of the elastic part 42. That is, the elastic gap 45 is formed between the elastic part 42 and the first long side 412, as well as between the elastic part 42 and the second long side 414, thereby allowing for the elastic deformation of the elastic part 42.

Referring to FIG. 8, the connecting post 12 is movable within the through hole 41 and the moving hole 22. The connecting post 12 is a cylindrical body, and the diameters of the first arc 411 and the second arc 413 are equal to the diameter of the connecting post 12, thereby ensuring that the connecting pin is stably self-locked in either the first arc 411 or the second arc 413 without affecting the pivoting and cutting of the scissors. Preferably, the first arc 411 and the second arc 413 are symmetrically arranged, with the first long side 412 and the second long side 414 symmetrically arranged and parallel to each other. The centers of the first arc 411 and the second arc 413 are located on the symmetry axis of the first long side 412 and the second long side 414, thereby making the position switching smoother.

Referring to FIGS. 7 and 8, the elastic switchable member 4 is a sheet-like structure, and the outer contour of the receiving groove 23 is matched with the outer contour of the elastic switchable member 4. The top surface of the elastic switchable member 4 is flush with the surface of the first scissor blade 2, thereby ensuring that the elastic switchable member 4 does not interfere with the mutual pivoting and cutting between the first scissor blade 2 and the second scissor blade 3.

Figure 10:
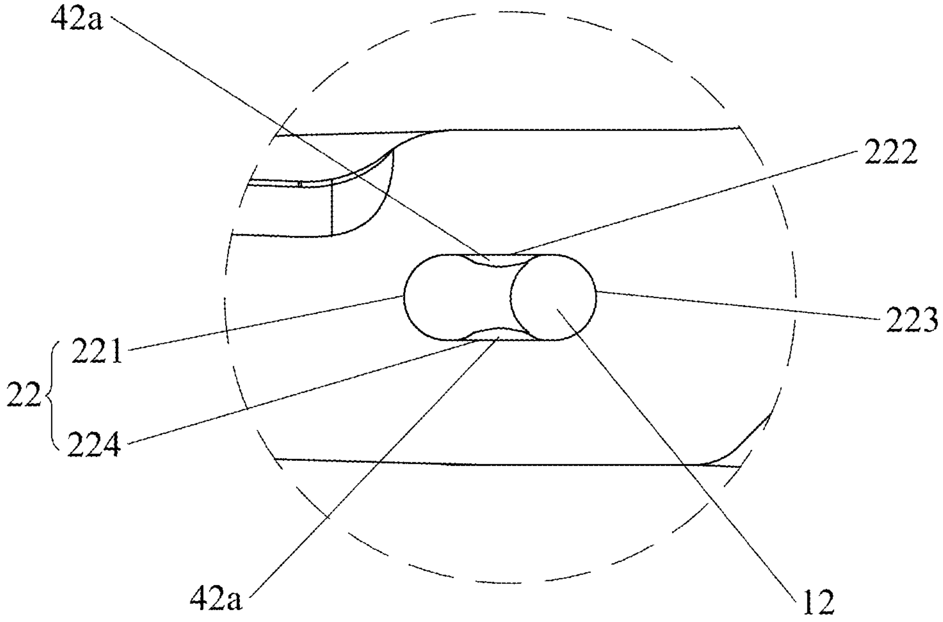
FIG. 10 is an enlarged partial view of point A of FIG. 9.
Figure 11:
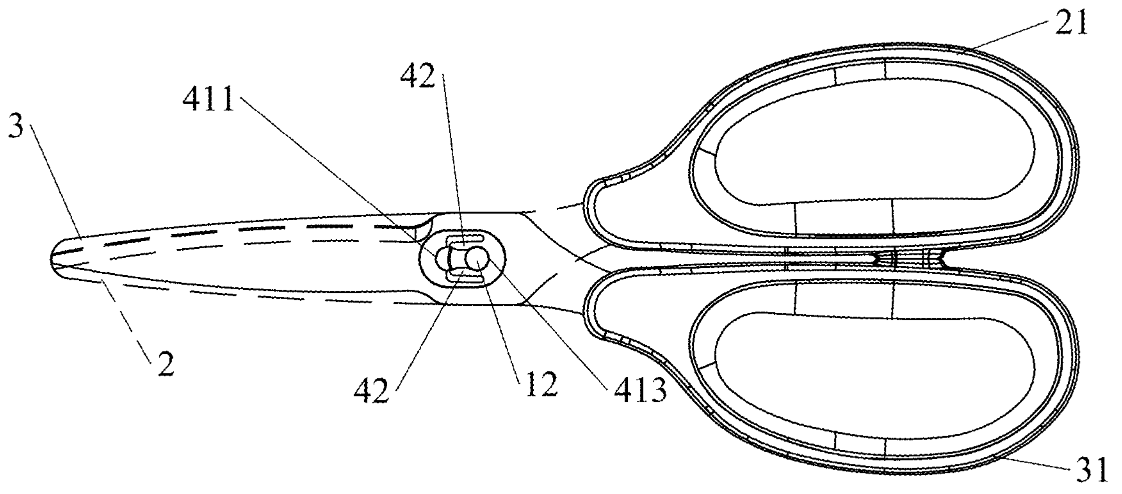
FIG. 11 is an internal structural diagram of the elastic switchable scissors for unpacking of FIG. 2.

Referring to FIG. 10, the moving hole 22 includes a third arc 221, a third long side 222, a fourth arc 223, and a fourth long side 224. The third arc 221, the third long side 222, the fourth arc 223, and the fourth long side 224 are sequentially arranged and together form the moving hole 22. Specifically, the distance between the third long side 222 and the fourth long side 224, as well as the diameters of the third arc 221 and the fourth arc 223, are equal to the diameter of the connecting post 12, thereby allowing the connecting post 12 to move or rotate back and forth within the moving hole 22. Preferably, the third arc 221 and the fourth arc 223 are symmetrically arranged, with the third long side 222 and the fourth long side 224 symmetrically arranged and parallel to each other. The centers of the third arc 221 and the fourth arc 223 are located on the symmetry axis of the third long side 222 and the fourth long side 224, which is not limited however.

Referring to FIGS. 6 and 7, the connecting pin 1 includes a cap 11 and a connecting post 12 that are connected to each other. The connecting post 12 is movable within the through-hole 41 and the moving hole 22, while the cap 11 is arranged outside the first scissor blade 2. A protective ring 13 is sleeved on the cap 11 to reduce wear on the cap 11 and improve the user experience.

Figure 4:
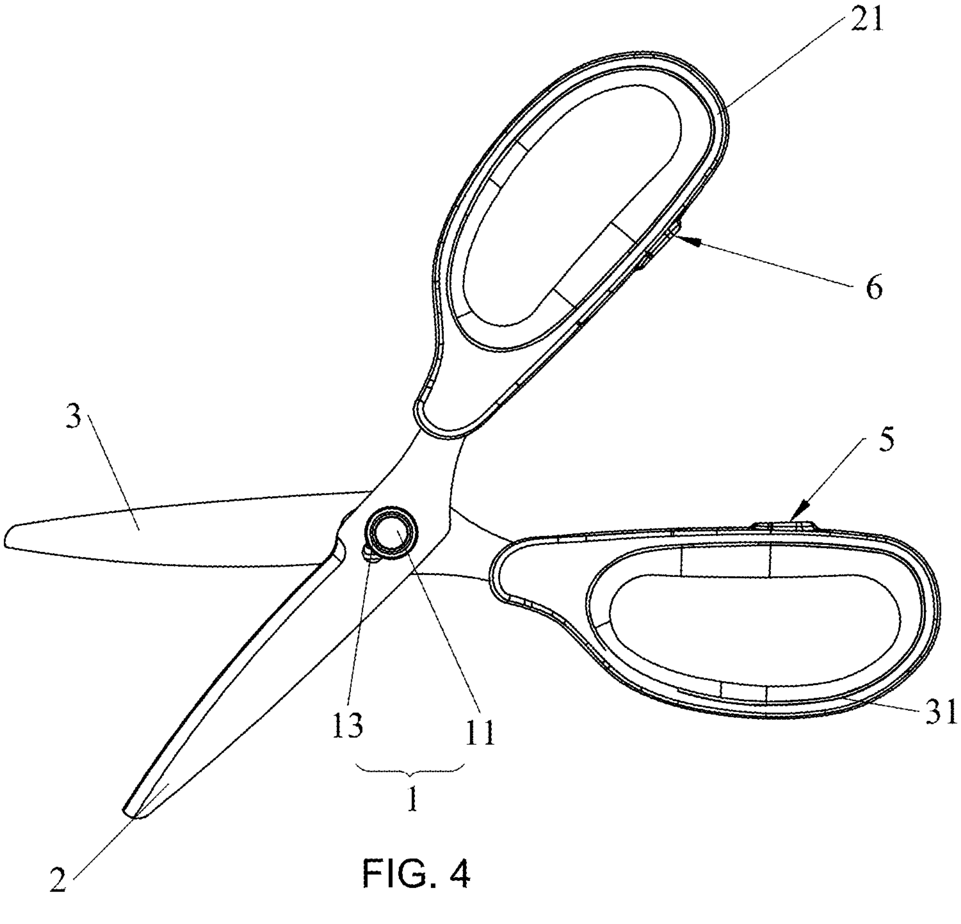
FIG. 4 is a front view of the elastic switchable scissors for unpacking of FIG. 3.

Referring to FIG. 4, the inner side of the first scissor handle 21 is provided with a first buffer protrusion 6, and the inner side of the second scissor handle 31 is provided with a second buffer protrusion 5. The first buffer protrusion corresponds to the second buffer protrusion, thereby improving comfort during use.

In summary, referring to FIGS. 1 to 13, a detailed description of the working process of the elastic switchable scissors 100 for unpacking of the present invention follows. By manually pushing the first scissor blade 2 and the second scissor blade 3 to overcome the resistance of the elastic part 42, the first scissor blade 2 is switched to the retracted position relative to the second scissor blade 3. At this position, the blade tip of the second scissor blade 3 is protruded beyond the blade tip of the first scissor blade 2, so that the first scissor blade 2 is not aligned with and the second scissor blade 3, and can move relative to the second scissor blade 3 in a staggered manner (referring to FIG. 13). When the first scissor blade 2 and the second scissor blade 3 are fully closed, the blade tip of the second scissor blade 3 is exposed, by which the transparent tapes or packaging straps can be cut so as to unpack the box or case. By manually pushing the first scissor blade 2 and the second scissor blade 3 to overcome the resistance of the elastic part 42, the first scissor blade 2 is switched to the extended position relative to the second scissor blade 3. At this position, the blade tip of the second scissor blade 3 is aligned with the blade tip of the first scissor blade 2 (referring to FIG. 11). When the manual pushing force is withdrawn, the first scissor blade 2 is self-locked in either the extended or retracted position relative to the second scissor blade 3.

By setting the elastic switchable member 4 between the first scissor blade 2 and the second scissor blade 3, the movement of the connecting pin 1 within the moving hole 22 allows the first scissor blade 2 to move back and forth relative to the second scissor blade 3. The first scissor blade 2 has an extended position and a retracted position relative to the second scissor blade 3. When the first scissor blade 2 is in the retracted position, the blade tip of the second scissor blade 3 is protruded beyond the blade tip of the first scissor blade 2, so that the first scissor blade 2 is not aligned with and the second scissor blade 3, and can move relative to the second scissor blade 3 in a staggered manner (referring to FIG. 13). When the first scissor blade 2 and the second scissor blade 3 are fully closed, the blade tip of the second scissor blade 3 is exposed, by which the transparent tapes or the packaging straps can be cut so as to unpack the box. When the first scissor blade 2 is in the extended position, the blade of the second scissor blade 3 is aligned with the blade of the first scissor blade 2. The first scissor blade 2 has a receiving groove 23 on the surface facing the second scissor blade 3, which is connected with the moving hole 22. The elastic switchable member 4 is positioned within the receiving groove 23 and is clamped between the first scissor blade 2 and the second scissor blade 3. The receiving groove 23 provides an assembly space for the elastic switchable member 4, ensuring that the elastic switchable member 4 is stably clamped between the first scissor blade 2 and the second scissor blade 3. The elastic switchable member 4 is positioned within the receiving groove 23 and is clamped between the first scissor blade 2 and the second scissor blade 3, and the elastic part 42 of the elastic switchable member 4 is extended into the projection area of the moving hole 22 and can be operatively retracted to block or release the movement of the connecting pin 1 within the moving hole 22, allowing the first scissor blade 2 to be operatively switched between the extended position and the retracted position relative to the second scissor blade 3. It is understood that, with the action of the moving hole 22, the first scissor blade 2 can freely move back and forth relative to the second scissor blade 3, without locked in the extended or retracted position. The elastic action part 42*a* of the elastic part 42, which extends into the projection area of the moving hole 22, cooperates with the moving hole 22 to provide resistance when the first scissor blade 2 switches between the extended and retracted positions relative to the second scissor blade 3. Manual pushing force is required to overcome the resistance of the elastic part 42 so that the elastic part 42 of the elastic switchable member can be operatively retracted to block or release the movement of the connecting pin within the moving hole 22, thereby allowing the first scissor blade 2 to be operatively switched between the extended position and the retracted position relative to the second scissor blade 3. When the manual pushing force is withdrawn, the first scissor blade 2 is self-locked in either the extended or retracted position relative to the second scissor blade 3. The structure is simple, and the switching is flexible, without the need for an additional locking structure. The elastic switchable member 4, the first scissor blade 2, and the second scissor blade 3 are provided separately, not only facilitating assembly but also allowing the elastic switchable member 4 to be replaced without the need to replace the first scissor blade 2, thereby meeting production requirements.

The above disclosure is only exemplary embodiments of the present invention, and it should not be construed to limit the scope of the present invention. Therefore, equivalent changes made according to the claims of the present invention are still within the scope covered by the present invention.

What is claimed is:

1. Elastic switchable scissors for unpacking, comprising a connecting pin, and a first scissor blade and a second scissor blade capable of cutting, wherein a tail end of the first scissor blade is connected with a first scissor handle, and a tail end of the second scissor blade is connected with a second scissor handle; the first scissor blade is provided with a moving hole for allowing the connecting pin to move, the connecting pin passes through the moving hole and is fixedly connected to the second scissor blade, thereby allowing the first scissor blade to pivot around the connecting pin relative to the second scissor blade; the first scissor blade is movable back and forth relative to the second scissor blade by virtue of a movement of the connecting pin within the moving hole, with an extended position and a retracted position; the elastic switchable scissors further comprises an elastic switchable member which has at least one elastic part, the first scissor blade is provided with a receiving groove on a surface facing the second scissor blade, which is connected with the moving hole, the elastic switchable member is positioned in the receiving groove and clamped between the first and second scissor blades, and the at least one elastic part of the elastic switchable member is extended into a projection area of the moving hole and is retractable to block or release the movement of the connecting pin within the moving hole, thereby allowing the first scissor blade to be operatively switched between the extended position and the retracted position relative to the second scissor blade;

wherein the elastic switchable member comprises a switching body, with a through hole provided on the switching body, the connecting pin also passes through the through hole, and the switching body is extended to the through hole to form the at least one elastic part.

2. The elastic switchable scissors for unpacking according to claim 1, wherein the at least one elastic part comprises two elastic parts that are provided and symmetrically arranged along a moving direction of the first scissor blade, with a distance between the two elastic parts being less than a diameter of the connecting pin.

3. The elastic switchable scissors for unpacking according to claim 1, wherein the through hole comprises a first arc, a first long side, a second arc, and a second long side which are sequentially arranged to define the through hole, and the at least one elastic part is provided between the first arc and the first long side and/or between the second arc and the second long side.

4. The elastic switchable scissors for unpacking according to claim 3, wherein the first arc, the at least one elastic part, and the second arc together define a switching channel for the connecting pin, when the connecting pin moves to the first arc, the first scissor blade is in the retracted position; when the connecting pin moves to the second arc, the first scissor blade is in the extended position.

5. The elastic switchable scissors for unpacking according to claim 4, wherein an elastic gap is formed between the through hole and one side of the at least one elastic part away from the switching channel, thereby allowing for elastic deformation of the at least one elastic part.

6. The elastic switchable scissors for unpacking according to claim 3, wherein the connecting pin comprises a cap and a connecting post that are connected to each other, where the connecting post is movable within the moving hole, the connecting post is cylindrical, and diameters of the first and second arcs are equal to a diameter of the connecting post.

7. The elastic switchable scissors for unpacking according to claim 3, wherein the first arc and the second arc are symmetrically arranged, the first long side and the second long side are symmetrically arranged and parallel to each other, and centers of the first and second arcs are located on a symmetry axis of the first and second long sides.

8. The elastic switchable scissors for unpacking according to claim 3, wherein the moving hole comprises a third arc, a third long side, a fourth arc, and a fourth long side which are sequentially arranged to define the moving hole.

9. The elastic switchable scissors for unpacking according to claim 8, wherein the connecting pin comprises a cap and a connecting post that are connected to each other, where the connecting post is movable within the moving hole, the connecting post is cylindrical, and diameters of the third and fourth arcs are equal to a diameter of the connecting post.

10. The elastic switchable scissors for unpacking according to claim 8, wherein the third arc and the fourth arc are symmetrically arranged, the third long side and the fourth long side are symmetrically arranged and parallel to each other, and centers of the third and fourth arcs are located on a symmetry axis of the third and fourth long sides.

11. The elastic switchable scissors for unpacking according to claim 1, wherein the elastic switchable member has a sheet-like structure.

12. The elastic switchable scissors for unpacking according to claim 1, wherein an outer contour of the receiving groove is matched with that of the elastic switchable member, and the elastic switchable member is flush with a surface of the first scissor blade.

13. The elastic switchable scissors for unpacking according to claim 1, wherein the connecting pin comprises a cap and a connecting post that are connected to each other, where the connecting post is movable within the moving hole, the cap is arranged outside the first scissor blade, and a protective ring is sleeved on the cap.

14. The elastic switchable scissors for unpacking according to claim 1, wherein an inner side of the first scissor handle is provided with a first buffer protrusion, and an inner side of the second scissor handle is provided with a second buffer protrusion, with the first and second buffer protrusions corresponding to each other.

* * * * *